United States Patent
Abedini et al.

(10) Patent No.: US 10,841,942 B2
(45) Date of Patent: Nov. 17, 2020

(54) SCHEDULING AND TIME-DOMAIN CONFIGURATION IN INTEGRATED ACCESS AND BACKHAUL

(71) Applicant: QUALCOMM Incorporated, San Diego, CA (US)

(72) Inventors: Navid Abedini, Somerset, NJ (US); Wanshi Chen, San Diego, CA (US); Junyi Li, Chester, NJ (US); Juergen Cezanne, Ocean Township, NJ (US); Karl Georg Hampel, Hoboken, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/228,171

(22) Filed: Dec. 20, 2018

(65) Prior Publication Data

US 2019/0313433 A1 Oct. 10, 2019

Related U.S. Application Data

(60) Provisional application No. 62/653,409, filed on Apr. 5, 2018.

(51) Int. Cl.
| | |
|---|---|
| *H04W 72/12* | (2009.01) |
| *H04B 7/155* | (2006.01) |
| *H04W 72/04* | (2009.01) |

(52) U.S. Cl.
CPC ........ *H04W 72/1289* (2013.01); *H04B 7/155* (2013.01); *H04W 72/0446* (2013.01)

(58) Field of Classification Search
CPC ................ H04B 7/155; H04B 7/15542; H04B 7/15507; H04B 7/15514; H04B 7/15528;
(Continued)

(56) References Cited

U.S. PATENT DOCUMENTS

| | | | |
|---|---|---|---|
| 2006/0025136 A1* | 2/2006 | Fujita | H04W 74/0816 455/436 |
| 2011/0249611 A1* | 10/2011 | Khandekar | H04B 7/155 370/315 |

(Continued)

OTHER PUBLICATIONS

ERICSSON: "Duplexing in IAB", 3GPP Draft; R2-1801024—Duplexing in IAB, 3rd Generation Partnership Project (3GPP)Mobile Competnece Centre; 650, Route Des Lucioles; F-06018 (Jan. 12, 2018), pp. 1-6, XP051386524, Retrieved from the Internet: URL: https://www.3gpp.org/ftp/tsg_ran/WG2_RL2/TSGR2_AHs/2018_01_NR/Docs/ [retrieved on Jan. 12, 2018].

(Continued)

*Primary Examiner* — Maharishi V Khirodhar
*Assistant Examiner* — Kenneth P Hunt
(74) *Attorney, Agent, or Firm* — Patterson & Sheridan, LLP

(57) ABSTRACT

Certain aspects of the present disclosure provide techniques for scheduling and time-domain configuration in an integrated access and backhaul network. Certain aspects provide a method for wireless communication. The method generally includes receiving downlink control signaling indicating a time domain resource allocation for a wireless resource to communicate with a donor base station, determining a scheduling offset to use for the wireless resource within a set of available time domain resources not designated for communicating with one or more child nodes and not designated to a communication of one or more other nodes based on the indicated time domain resource allocation, and communicating with the donor base station using the wireless resource at the determined scheduling offset.

18 Claims, 12 Drawing Sheets

(58) Field of Classification Search
CPC .... H04B 7/204; H04B 7/2121; H04B 7/2123; H04B 7/15–15542; H04B 7/212–2123; H04W 72/0446; H04W 72/1289; H04W 84/047; H04W 88/04; H04W 72/02; H04W 72/042; H04W 72/0426; H04W 72/0433; H04W 72/044; H04W 72/1205; H04W 72/1278; H04W 72/04–10; H04W 72/12–14

See application file for complete search history.

(56) References Cited

U.S. PATENT DOCUMENTS

| | | | | |
|---|---|---|---|---|
| 2012/0044852 | A1* | 2/2012 | Zhang | H04W 72/1257 370/312 |
| 2014/0295883 | A1* | 10/2014 | Kang | H04W 64/00 455/456.1 |
| 2014/0301371 | A1* | 10/2014 | Maeda | H04W 36/32 370/331 |
| 2016/0330754 | A1* | 11/2016 | Martin | H04W 76/14 |
| 2017/0064731 | A1* | 3/2017 | Wang | H04W 72/1263 |
| 2017/0181112 | A1* | 6/2017 | Kuzmanovic | H04L 27/10 |
| 2018/0049164 | A1* | 2/2018 | Wu | H04W 72/12 |

OTHER PUBLICATIONS

Huawei et al., "Evaluation on the Dynamic and Flexible Resource Allocation in IAB", 3GPP Draft, R1-1801403, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397543, 6 Pages, Retrieved from the Internet:URL:http://www.3gpp.org/ftp/tsg%5Fran/WG1%5FRL1/TSGR1%6F92/Docs/ [retrieved on Feb. 17, 2018], Sections 1 and 2.

International Search Report and Written Opinion—PCT/US2019/015803—ISA/EPO—dated Apr. 12, 2019.

MCC Support: "Draft Report of 3GPP TSG RAN WG1 #AH_1801 v0.1.0 (Vancouver, Canada, Jan. 22-26, 2018)", 3GPP Draft; Draft_Minutes_Report_RAN1 #AH_1801_V01 0, 3rd Generation Partnership Projec (3GPP), Mobile Compentence Centre; 650, Routes Des Lucioles; F-06921 Sophia-Antipolis Cedex; France, vol. RAN WG1, No. Athens, Greece; Feb. 26, 2018-Mar. 2, 2018, Feb. 1, 2018 (Feb. 1, 2018). 84 Pages, XP051519418.

* cited by examiner

SCHEDULING AND TIME-DOMAIN CONFIGURATION IN INTEGRATED ACCESS AND BACKHAUL

CROSS-REFERENCE TO RELATED APPLICATION & PRIORITY CLAIM

The present application for patent claims priority to U.S. Provisional Application No. 62/653,409, filed Apr. 5, 2018, which is assigned to the assignee of the present application and hereby expressly incorporated by reference herein in its entirety.

BACKGROUND

Field of the Disclosure

Aspects of the present disclosure relate to wireless communications, and more particularly, to techniques for scheduling and time-domain configuration in integrated access and backhaul network, for example, for New Radio (e.g., 5G) communication systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes receiving downlink control signaling indicating a time domain resource allocation for a wireless resource to communicate with a donor base station, determining a scheduling offset to use for the wireless resource within a set of available time domain resources not designated for communicating with one or more child nodes and not designated to a communication of one or more other nodes based on the indicated time domain resource allocation, and communicating with the donor base station using the wireless resource at the determined scheduling offset.

Certain aspects provide a method for wireless communication. The method generally includes determining a time domain resource allocation for a wireless resource to communicate with a relay node within a set of available time domain resources not designated for the relay node to communicate with one or more child nodes and not designated to a communication of one or more other nodes, transmitting downlink control signaling indicating the time domain resource allocation for a scheduling offset to use for the wireless resource, and communicating with the relay node using the wireless resource at the scheduling offset.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
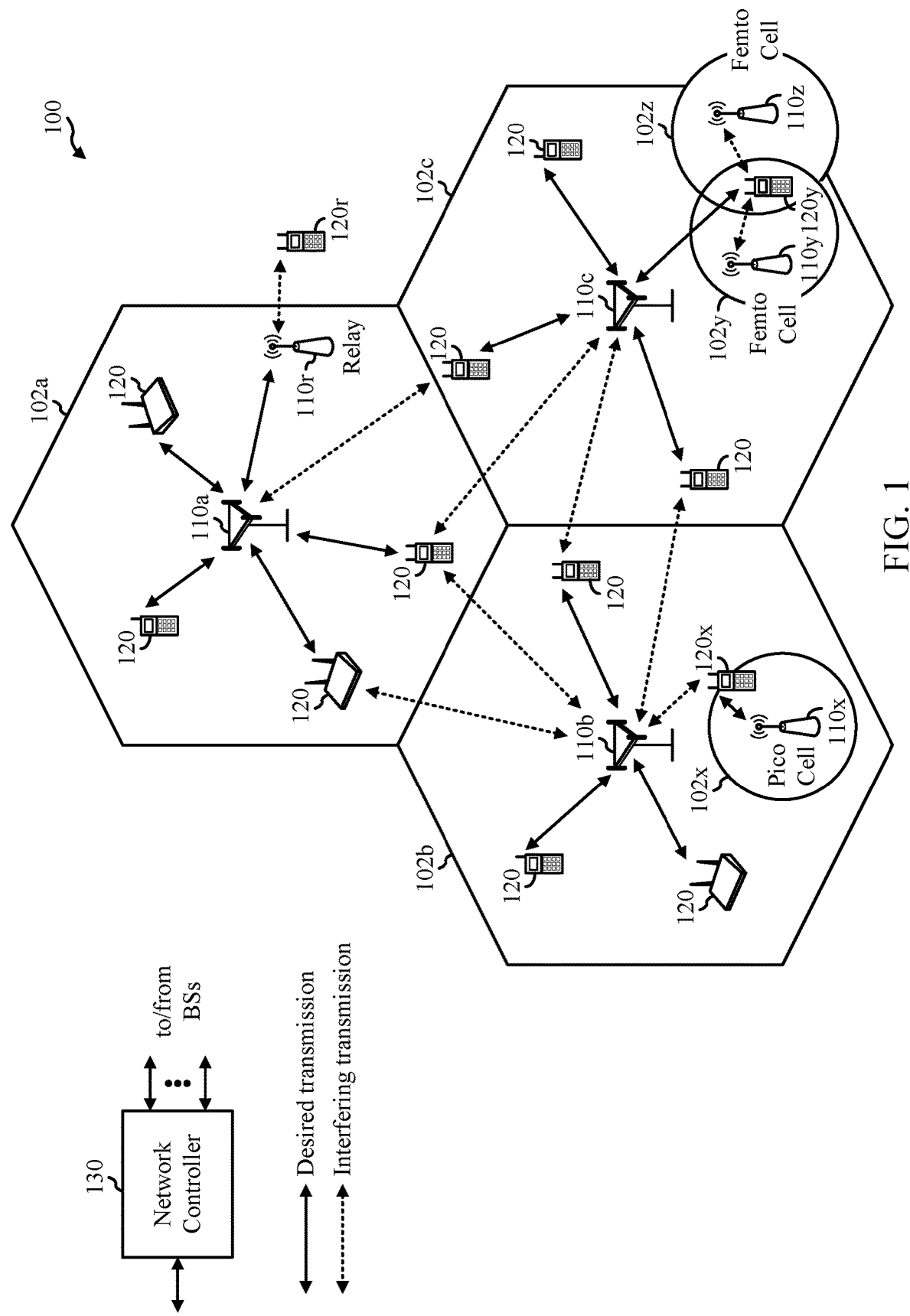
FIG. 1 is a block diagram conceptually illustrating an example telecommunications system, in accordance with certain aspects of the present disclosure.

Aspects of the present disclosure provide apparatus, methods, processing systems, and computer readable mediums for scheduling and time-domain configuration in integrated access and backhaul.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network where a base station (e.g., BS 110a) may schedule time-domain resources to reduce conflicts between access and backhaul links of a relay node (e.g., BS 110r) as further described herein with respect to the operations depicted in FIGS. 9 and 10.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
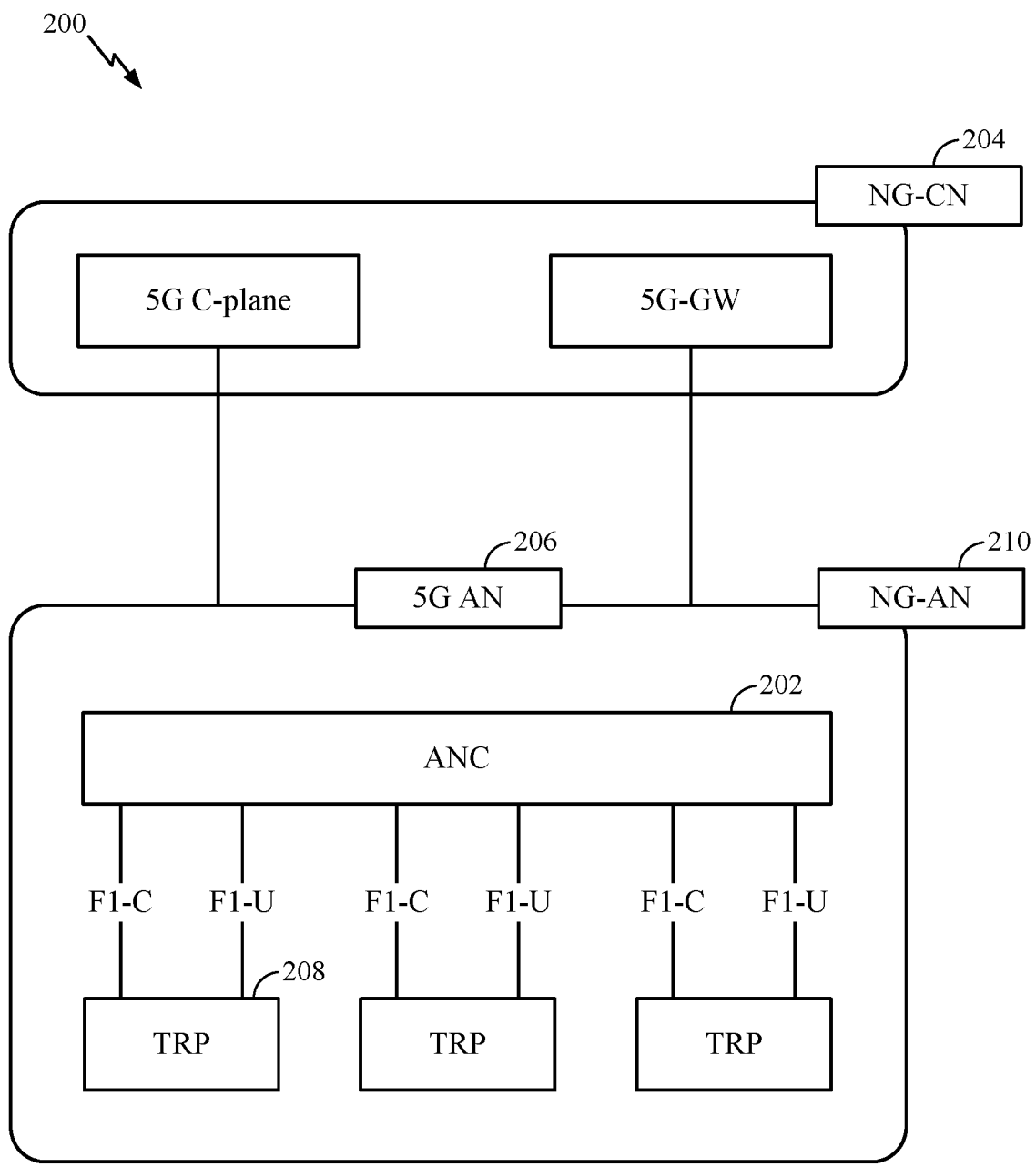
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
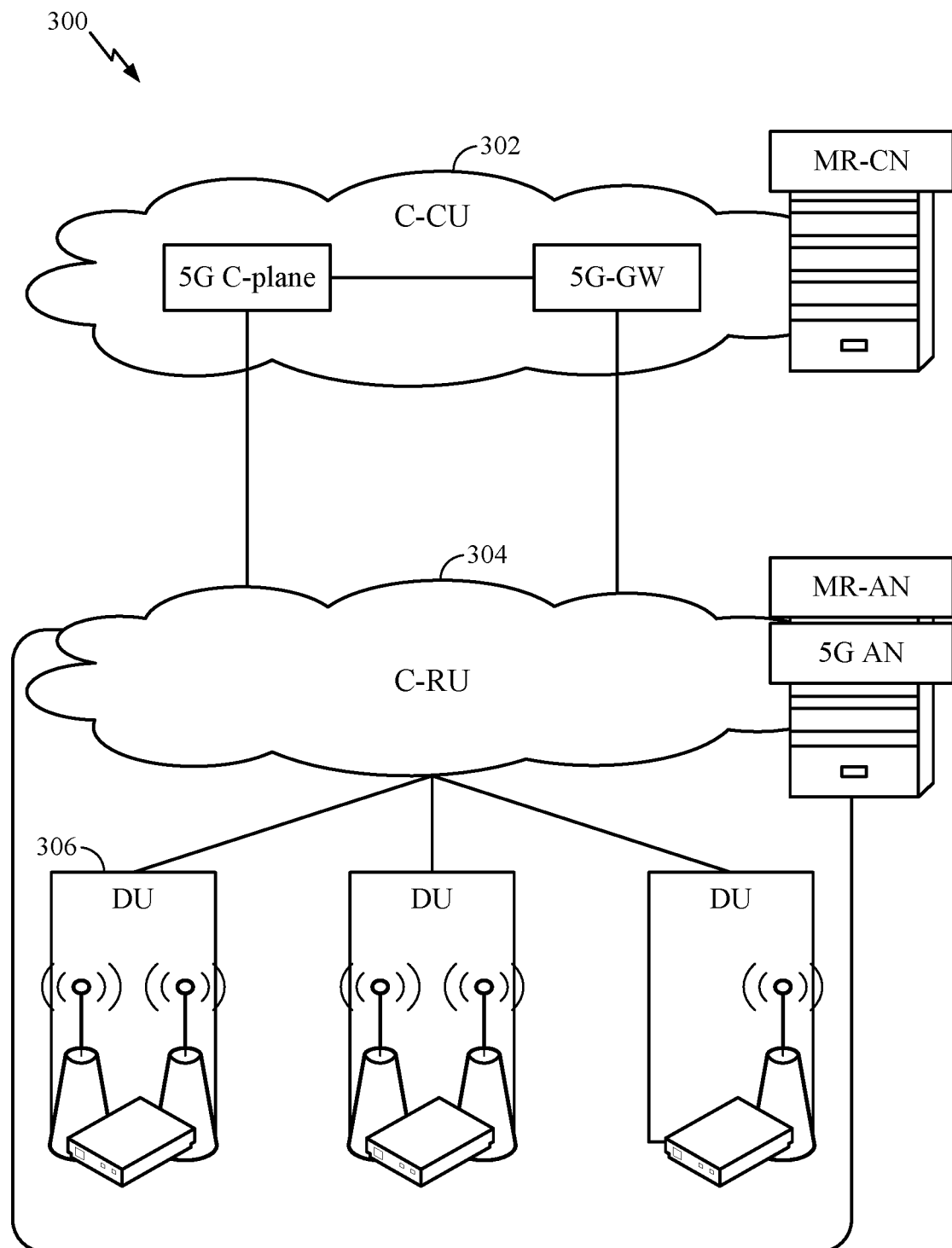
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
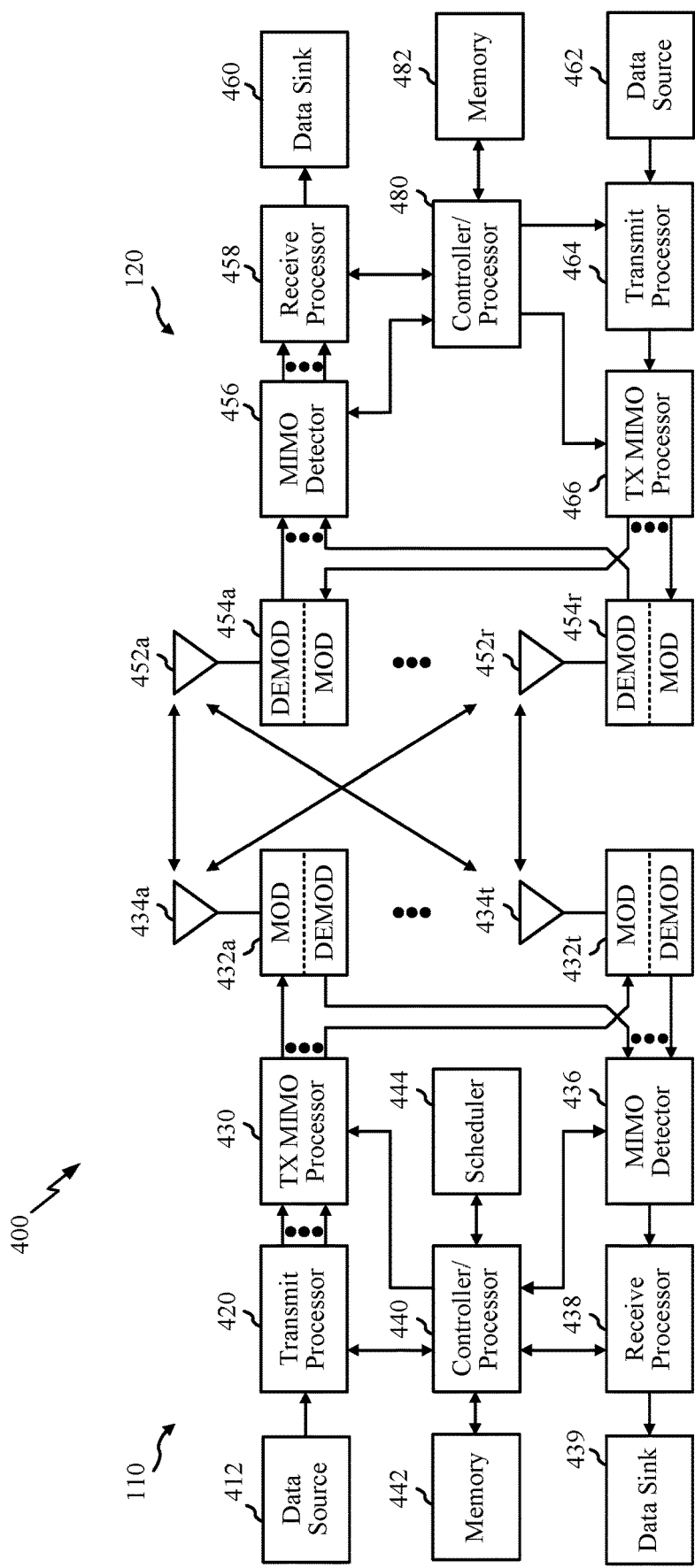
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
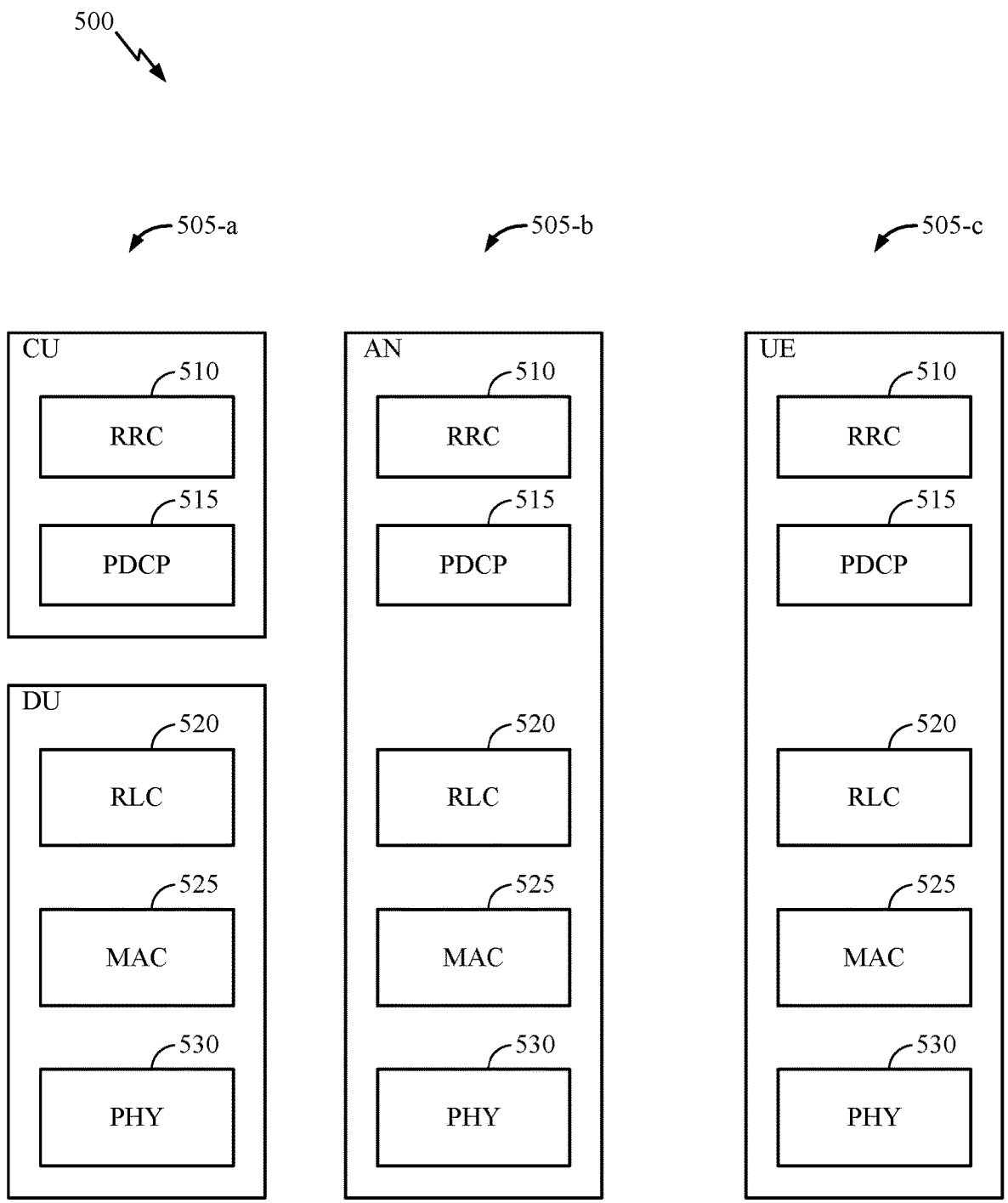
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
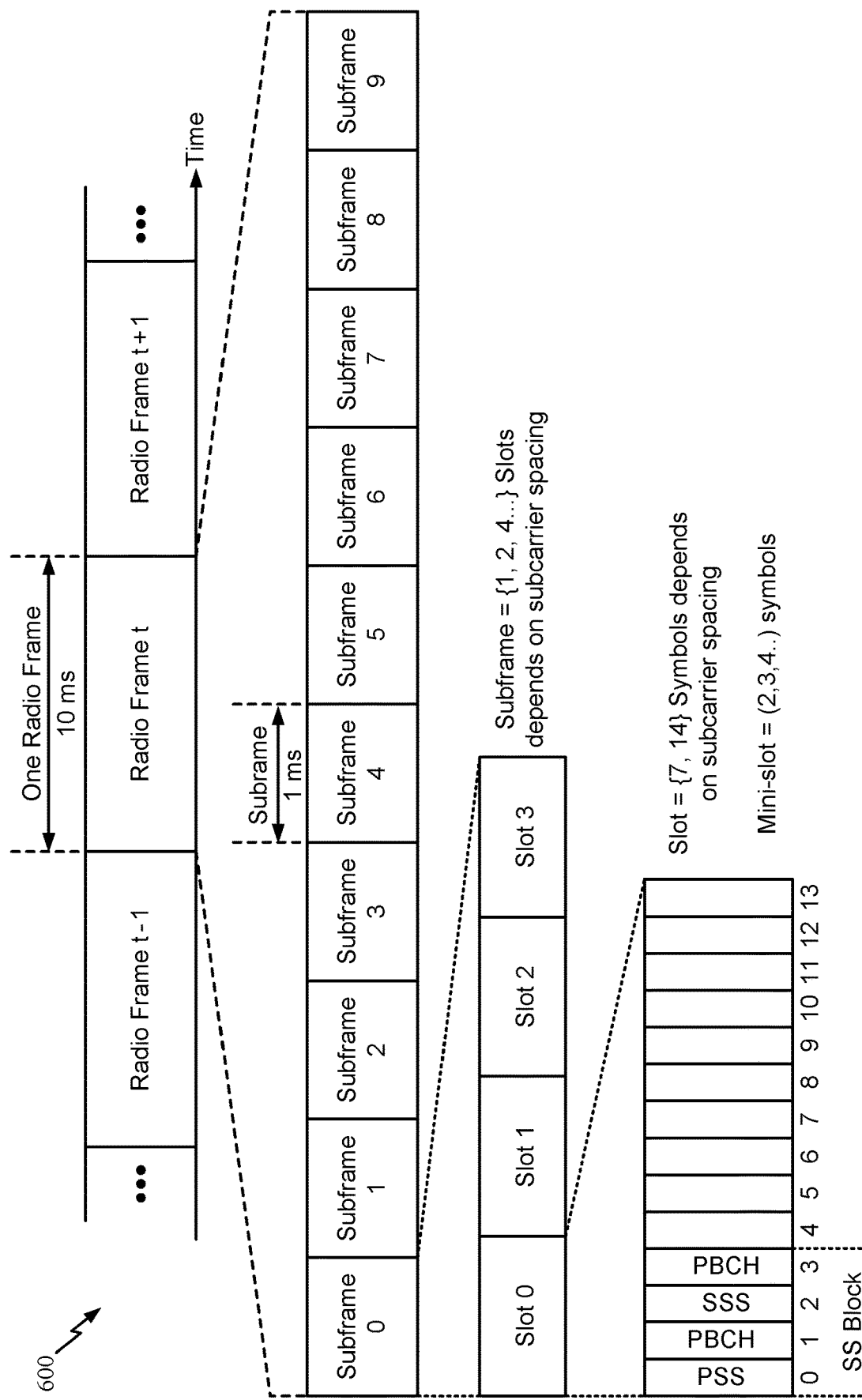
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping.

Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 7:
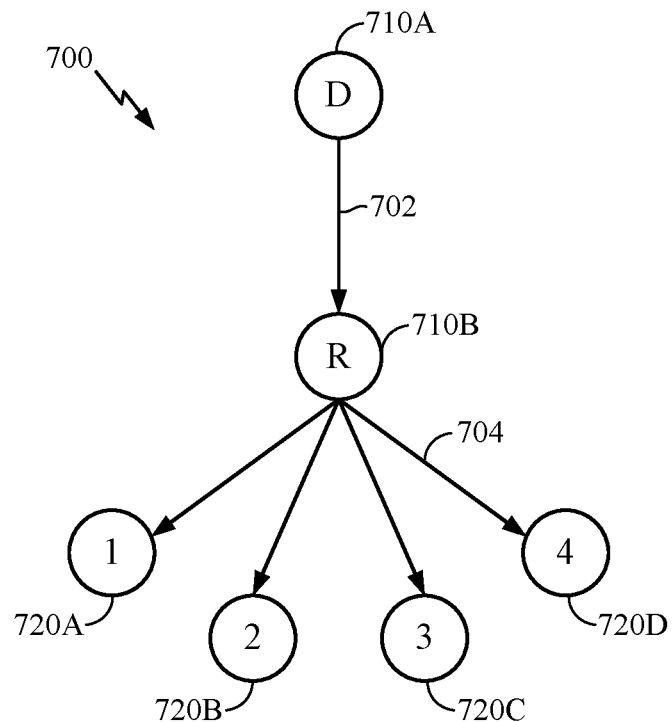
FIG. 7 is a diagram illustrating an example of an integrated access and backhaul (IAB) network in accordance with certain aspects of the present disclosure.

Example Scheduling and Time-Domain Configuration in Integrated Access and Backhaul In certain wireless communication systems (e.g., NR), base stations may be assigned integrated access and backhaul (IAB) links via wireless resources, facilitating greater network densification of base stations. For instance, FIG. 7 is a diagram illustrating an example of an integrated access and backhaul (IAB) network 700 in accordance with certain aspects of the present disclosure. The wireless IAB network 700 may include any number of scheduling entities (e.g., macro cells or pico cells) and UEs. In this example, a macro cell may be a donor base station (e.g., gNB), and a pico cell may be a relay node (e.g., an NR relay node). In the IAB network 700, a donor BS 710A may establish wireless backhaul links 702 with one or more relay nodes 710B. The relay node 710B may establish wireless access links 704 with one or more child nodes (e.g., UEs) 720A-D. Each link may include one or more carriers or channels for facilitating communication between base stations and UEs. The donor BS, relay nodes, and child nodes illustrated in FIG. 7 may be any of the BSs or UEs illustrated in FIGS. 1-4 discussed above. In some aspects of the disclosure, there may be additional layers of base stations between the donor base station 710A and the relay node 710B, or the relay node 710B may establish additional backhaul connections to other donor base stations.

Figure 8:
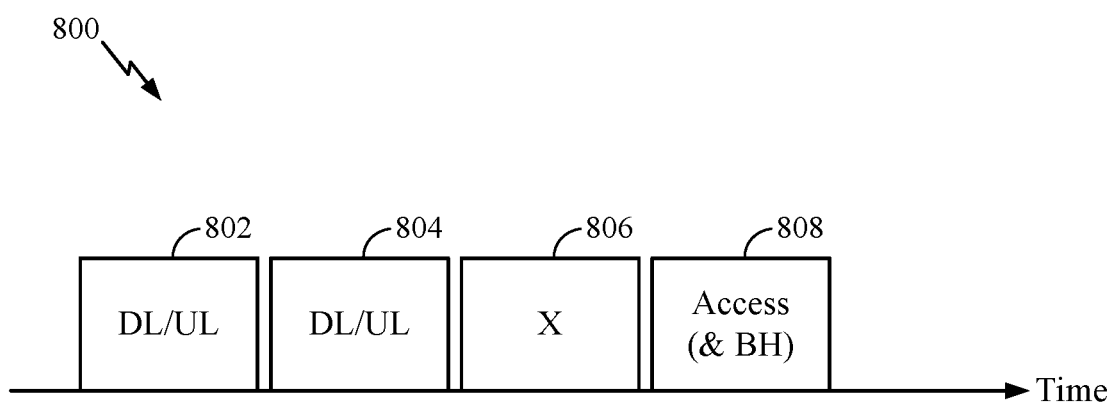
FIG. 8 illustrates an example timing diagram for an IAB network, according to certain aspects of the present disclosure.

In IAB networks, some time domain (TD) resources may not be available for a relay node to communicate with its donor BS. For instance, FIG. 8 illustrates an example timing diagram of TD resources 800 for an IAB network, in accordance with certain aspects of the present disclosure. As shown, a relay node may communicate with its donor base station at TD resource 802. The relay node may communicate with it child nodes at TD resource 804. The relay node may not be allowed to communicate with other devices at TD resource 806 (e.g., to prevent interference with scheduled transmissions). The TD resource 808 may be reserved for access connections such as synchronization signals.

In physical layer procedures for NR of 3GPP Release 15, TD resource allocations for the PDSCH, PUCCH (e.g., downlink-acknowledgement (DL-ACK)), and PUSCH may conflict with resources designated for IAB communications. For instance, a slot allocated for the PDSCH as provided in Release 15 is determined by $K_0$ transmitted to a relay node via downlink signaling (e.g., a downlink control information (DCI) scheduling message). The slot allocated for the PDSCH is offset from n by $K_0$ slots (i.e., n+$K_0$), where n is the slot with the DCI scheduling message, and $K_0$ may be equal to 0, 1, 2, or 3 (or 0 through 32) with 0 being the default value if $K_0$ is left blank in the scheduling message. The slot allocated for the PDSCH by the donor BS to the relay node may overlap with TD resources designated for IAB communications such as when the relay node is not allowed to communicate.

As another example, a slot allocated for the DL-ACK (via PUCCH) is determined by $K_1$ transmitted to a relay node via downlink signaling (e.g., a DCI scheduling message). The slot allocated for the DL-ACK is offset from n by $K_1$ slots (i.e., n+$K_1$), where n is the slot where the last symbol of the corresponding PDSCH is received, and $K_1$ may be equal to 0 through 8 (or 0 through 15). The slot allocated for the PUCCH by the donor BS to the relay node may overlap with TD resources designated for IAB communications such as scheduled communications with child nodes.

A slot allocated for the PUSCH is determined by $K_2$ transmitted to a relay node via downlink signaling (e.g., a DCI scheduling message). The slot allocated for the PUSCH is offset from n by $K_2$ slots (i.e., n+$K_2$), where n is the slot with the scheduling message, and $K_2$ may be equal to 0 through 7 (or 0 through 32). Each of these TD resource allocations received by the relay node to communicate with its donor BS may overlap with scheduled IAB communications, such as communications scheduled between a relay node and its child nodes.

Certain aspects of the present disclosure provide techniques and apparatus for resolving time-domain resource scheduling conflicts in IAB networks for NR wireless communications. The TD scheduling operations described herein may enable a relay node to communicate with its donor BS without conflicting with other scheduled communications.

Figure 9:
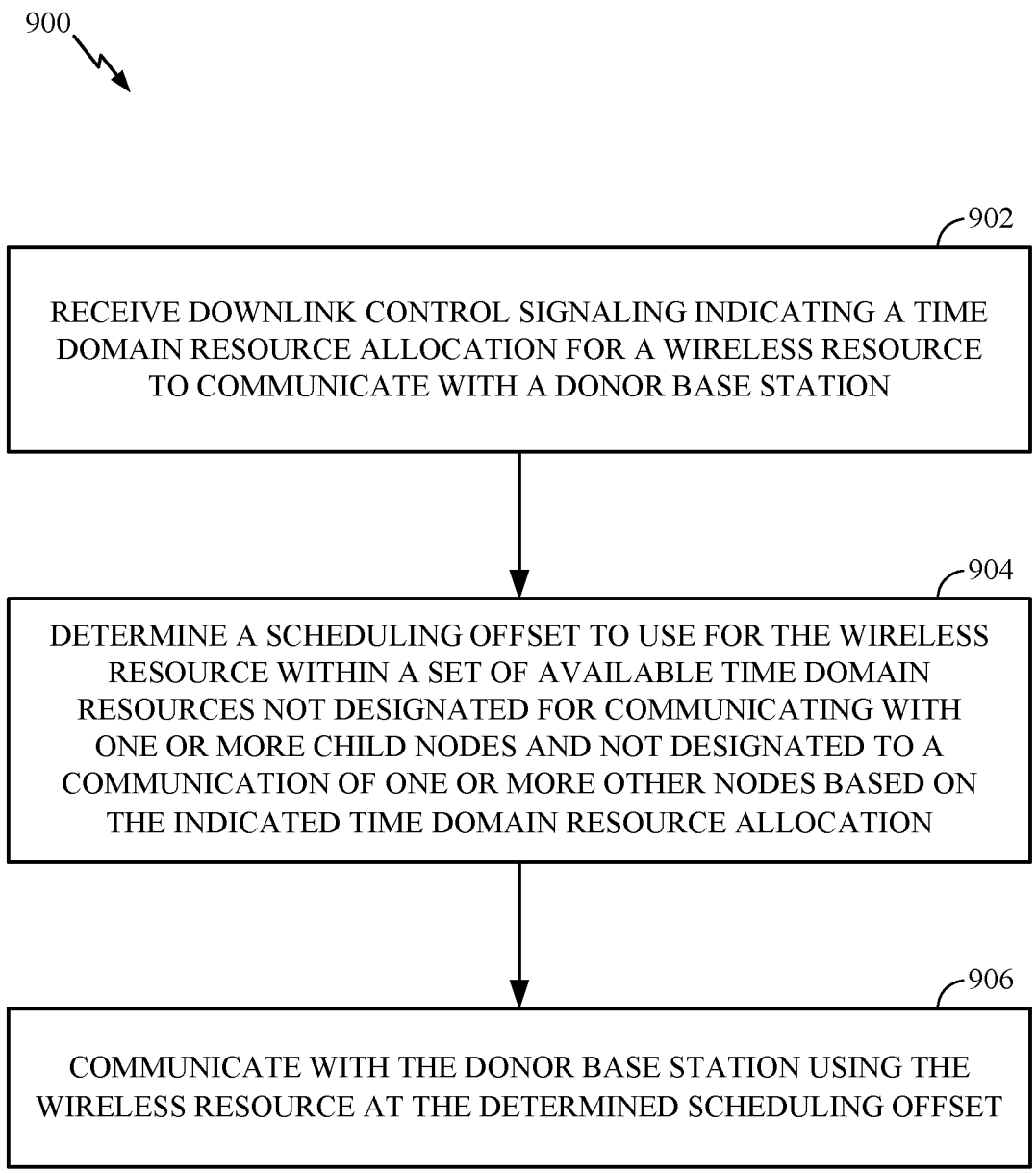
FIG. 9 is a flow diagram illustrating example operations for wireless communications, according to certain aspects of the present disclosure.

FIG. 9 is a flow diagram illustrating example operations 900 that may be performed, for example, by a relay node (e.g., relay node 710B or BS 110), for resolving scheduling conflicts of TD resource allocations in an IAB network, in accordance with certain aspects of the present disclosure.

Operations 900 may begin, at 902, where the relay node receives downlink control signaling, for example for a donor BS, indicating a time domain resource allocation for a wireless resource to communicate with the donor BS. At 904, the relay node determines a scheduling offset to use for the wireless resource within a set of available time domain resources not designated for communicating with one or more child nodes (e.g. TD resource 804) and not designated to a communication of one or more other nodes (such as a TD resource that the relay node is not allowed to use (e.g., TD resource 806)) based on the indicated time domain resource allocation. At 906, the relay node communicates with the donor BS using the wireless resource at the determined scheduling offset.

Figure 10:
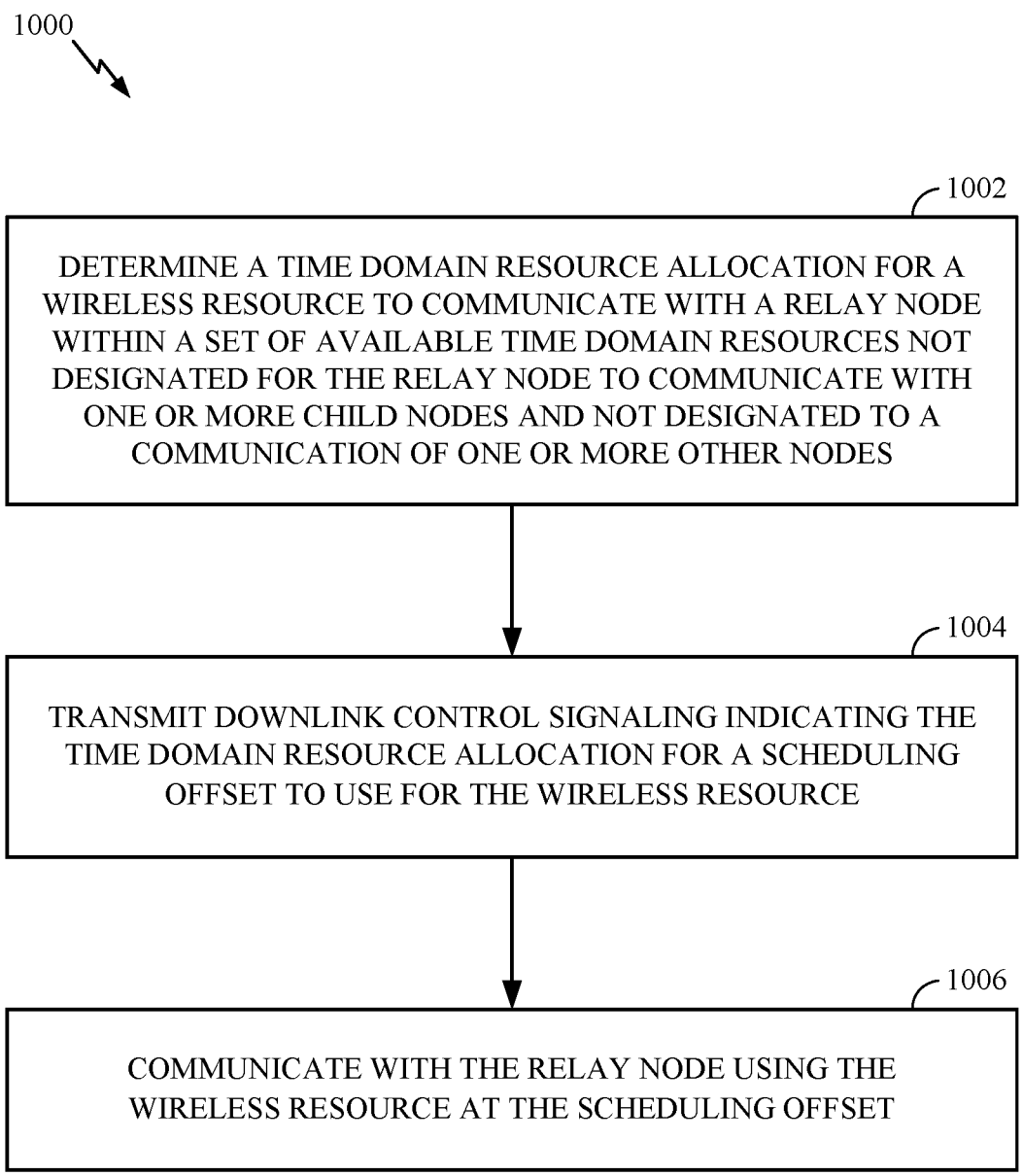
FIG. 10 is a flow diagram illustrating example operations for wireless communications, according to certain aspects of the present disclosure.

FIG. 10 is a flow diagram illustrating example operations 1000 that may be performed, for example, by a donor base station (e.g., donor BS 710A or BS 110), for resolving scheduling conflicts of TD resource allocations in an IAB network, in accordance with certain aspects of the present disclosure.

Operations 1000 may begin, at 1002, where the donor BS determines a time domain resource allocation for a wireless resource to communicate with a relay node within a set of available time domain resources not designated for the relay node to communicate with one or more child nodes (e.g., TD resource 804) and not designated to a communication of one or more other nodes (such as a TD resource that the relay node is not allowed to use (e.g., TD resource 806)). At 1004, the donor BS transmits downlink control signaling, for example to the relay node, indicating the time domain resource allocation for a scheduling offset to use for the wireless resource. At 1006, the donor BS communicates with the relay node using the wireless resource at the scheduling offset.

Figure 11:
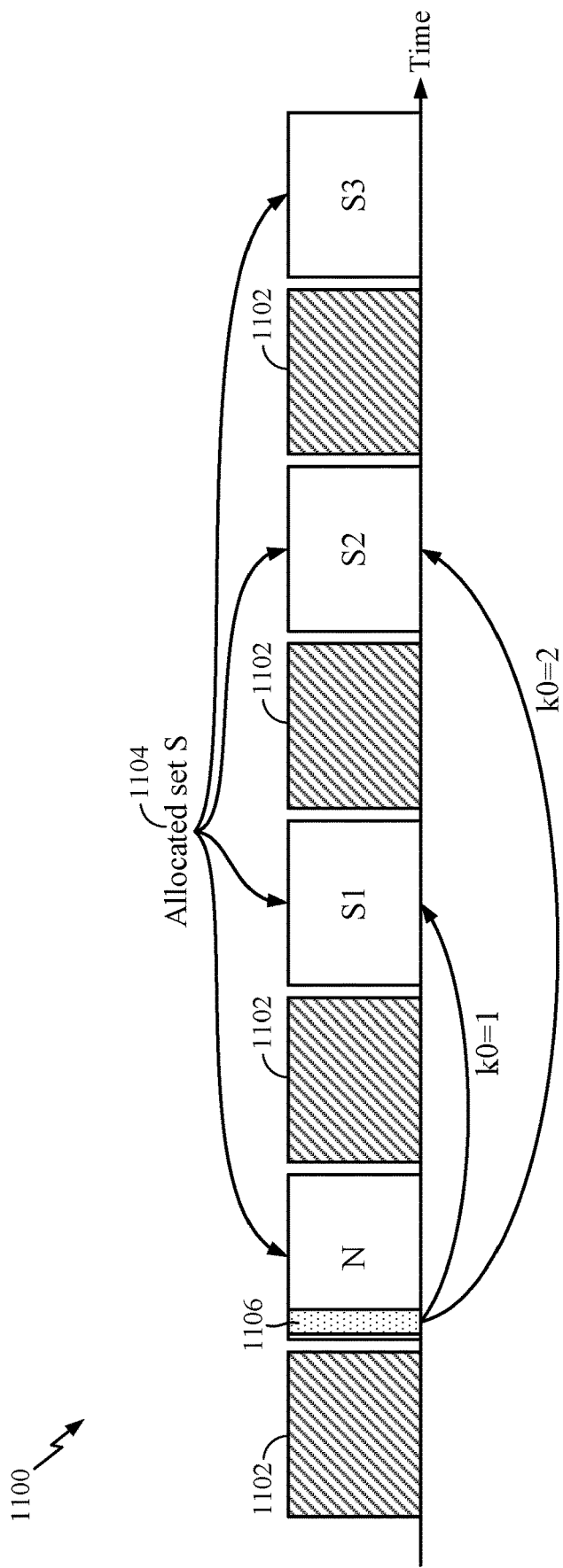
FIG. 11 illustrates an example timing diagram for determining a scheduling offset for backhaul communications, according to certain aspects of the present disclosure.

In certain aspects, the TD resource allocation (e.g., $K_0$, $K_1$, and $K_2$ for PDSCH, PUCCH, and PUSCH, respectively) may account for IAB scheduled communications. For instance, the scheduling offset may be spaced from a reference point within the set of available time domain resources based on the indicated time domain resource allocation. FIG. 11 illustrates an example timing diagram of TD resources 1100 for determining the scheduling offset for backhaul communications between a relay node and donor BS, in accordance with certain aspects of the present disclosure. As shown, slots 1102 may be TD resources designated for non-backhaul communications (e.g., communications between the relay node and its child nodes or empty slots as described herein with respect to FIG. 8). The remaining slots may be designated as a set of available resources 1104 (S) for backhaul communications. The set of available resources 1104 may include the reference slot N and one or more slots S1-S3. In certain aspects, the set of available resources may include resources not designated for the relay node to communicate with one or more child nodes (e.g., TD resource 804) and/or resources not designated to a communication of one or more other nodes (e.g., TD resource 806).

The relay node may receive downlink control signaling 1106 (e.g., a DCI scheduling message) indicating the TD resource allocation (e.g., $K_0$, $K_1$, and $K_2$ for PDSCH, PUCCH, and PUSCH, respectively) at slot N. The relay node may determine the slot allocated for backhaul communications by identifying the slot spaced from N according to the indicated TD resource allocation. For example, if the indicated TD resource allocation $K_0$ equals 1, the slot allocated for PDSCH is spaced from N within the set of available resources 1104 by one slot at S1, where N is the slot of the downlink control signaling 1106. If $K_0$ equals 2, the slot allocated for PDSCH is spaced from N within the set of available resources 1104 by two slots at S2. The scheduling offset for the PUSCH may be determined in a similar fashion.

For a PUCCH resource allocation, the reference point N may be indicated by the received PDSCH. For example, if the downlink control signaling 1106 indicates a value for Kr, the slot allocated for the PUCCH is spaced from N within the set of available resources 1104, where N is the slot where the last symbol corresponding to the PDSCH is received.

Figure 12:
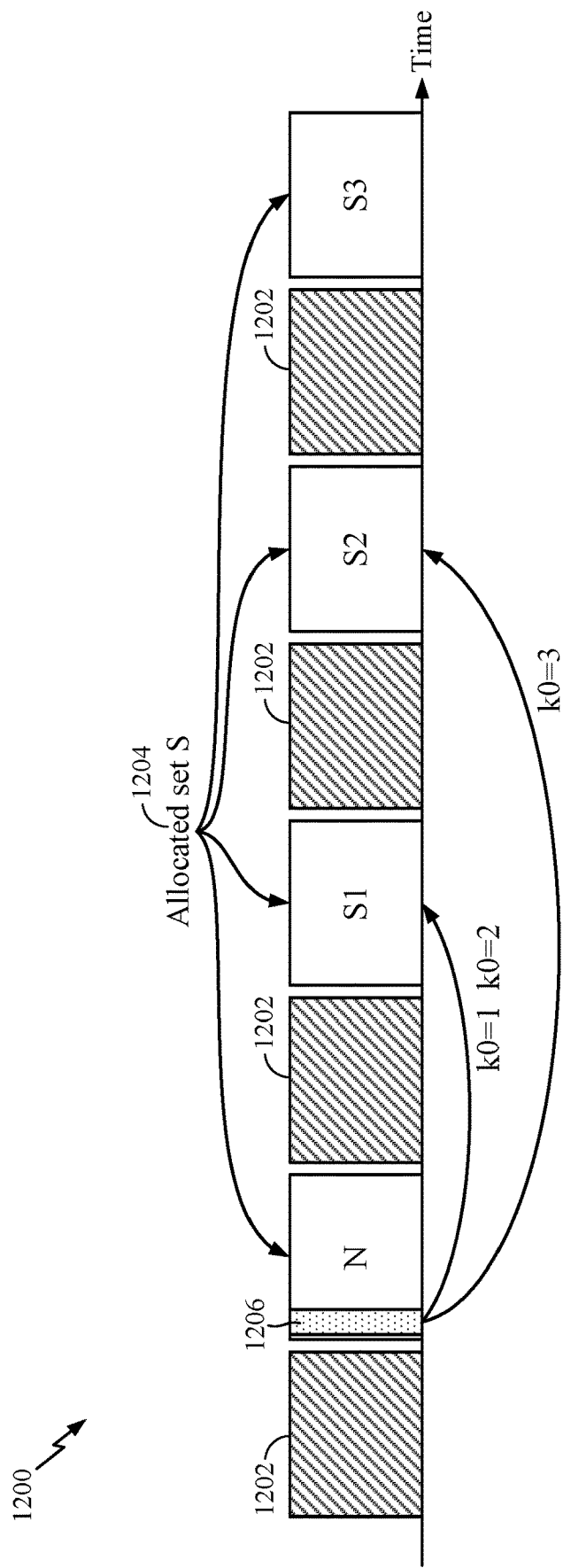
FIG. 12 illustrates an example timing diagram for determining a scheduling offset for backhaul communications, according to certain aspects of the present disclosure.

In certain aspects, the scheduling offset may be determined by identifying the first available TD resource after or including the indicated TD resource allocation spaced from the reference point. For instance, FIG. 12 illustrates an example timing diagram of TD resources 1200 for determining the scheduling offset for backhaul communications between a relay node and donor BS, in accordance with certain aspects of the present disclosure. Suppose the indicated TD resource allocation $K_0$ equals 1, in this example, the slot allocated for PDSCH is the first available resource (S1) after or including $N+K_0$, where N is the slot of the downlink control signaling 1206. If the indicated TD resource allocation $K_0$ equals 2, in this example, the first available resource after or including $N+K_0$ is again S1. But, if the indicated TD resource allocation $K_0$ equals 3, the first available resource after or including $N+K_0$ is S2. The scheduling offset for the PUSCH and the PUCCH may be determined in similar respects.

In certain aspects, the granularity of the TD resources indicated for the resource allocations as described herein may be any TD resource implemented in NR communication systems. For example, the scheduling offset may indicate one or more slots, one or more mini-slots, and/or one or more symbols relative to a reference point. Similarly, the TD resources indicated for the resource allocation may indicate one or more slots, one or more mini-slots, and/or one or more symbols.

In certain aspects, the indicated TD resource allocation may be designated for backhaul communications (e.g., TD resource 802). For example, the resource allocation $K_0$, $K_1$, and $K_2$ for PDSCH, PUCCH, and PUSCH, respectively, may be extended to include TD resources designated for backhaul communications. As another example, while $K_1$ may only take a value in 0 through 8 for communications of other UEs (e.g., TD resource 804 or 806), slots 9 through 15 for $K_1$ may be designated for backhaul communications (e.g., TD resource 802).

In certain aspects, the maximum number of resource allocations may be increased to provide TD resources designated for backhaul communications. $K_0$, $K_1$, and $K_2$ are indexes corresponding to lists of time-domain resource configurations, with each list having a maximum number of resource allocations. In Release 15, the maximum number of resource allocations for $K_0$ and $K_2$ is set to 16, whereas the maximum number of resource allocations for $K_1$ is set to 8. The maximum number of resource allocation may be increased to 32 or 64 resource allocations. That is, the maximum number of resource allocations is greater than a maximum number of resource allocations for a type of user equipment (e.g., an NR UE) and may be specifically increased for relay nodes.

In certain aspects, the indicated time domain resource allocation may include an aggregation factor indicating consecutive resources that are allocated for backhaul communications. For example, suppose the aggregation factor is equal to two, then the relay node or donor base station may identify two consecutive TD resources within the set of available resources based on the indicated time domain resource allocation as described herein. Example candidate values for the aggregation factor may include 2, 4, 8, or more consecutive resources.

Figure 13:
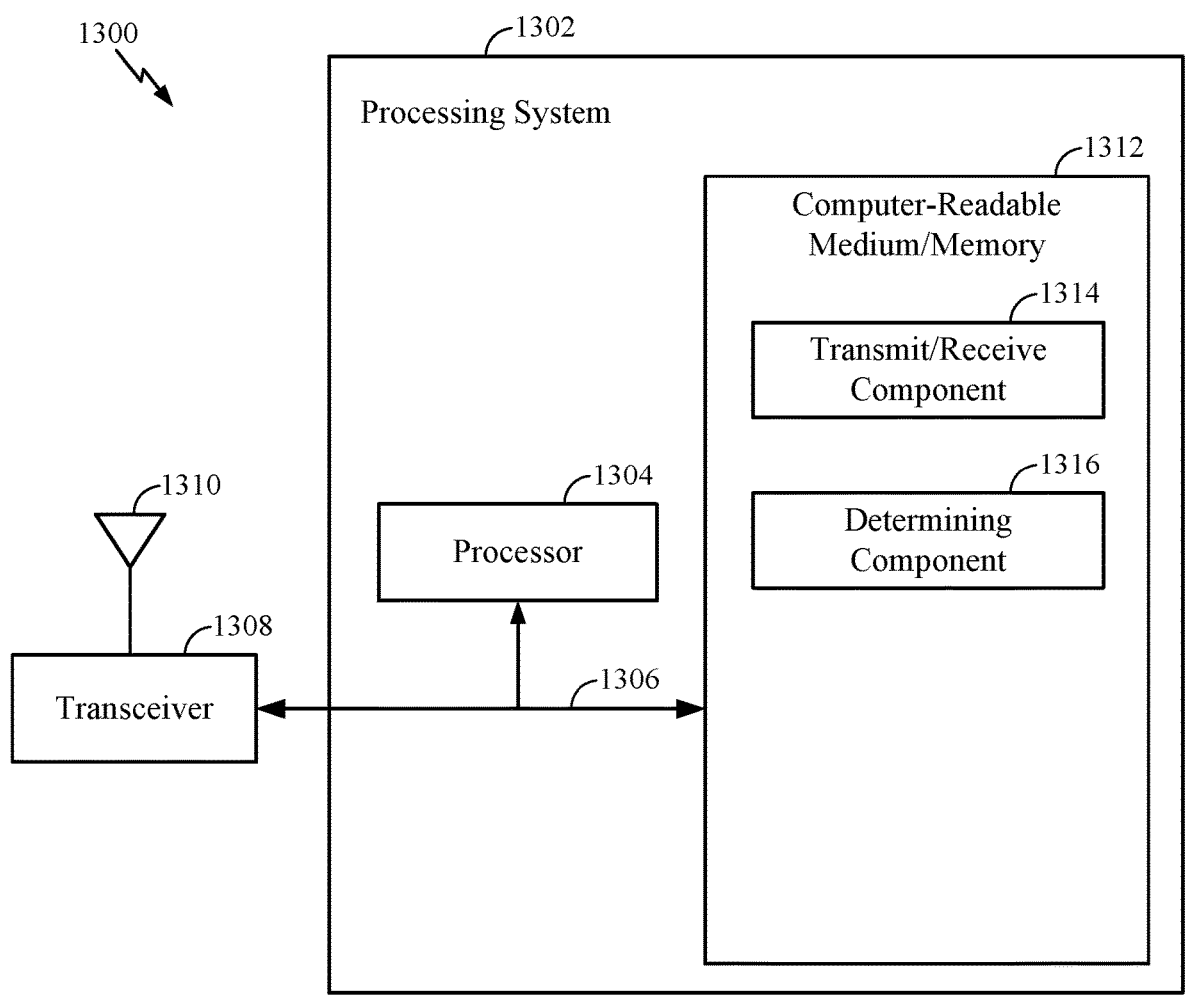
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 9 and 10. The communications device 1300 includes a processing system 1302 coupled to a transceiver 1308. The transceiver 1308 is configured to transmit and receive signals for the communications device 1300 via an antenna 1310, such as the various signal described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions that when executed by processor 1304, cause the processor 1304 to perform the operations illustrated in FIGS. 9 and 10, or other operations for performing the various techniques discussed herein.

In certain aspects, the processing system 1302 further includes a transmit/receive component 1314 for performing the operations illustrated in FIGS. 9 and 10, such as transmitting, receiving, reporting, or communicating. Additionally, the processing system 1302 includes a determining component 1316 for performing the operations illustrated in FIGS. 9 and 10. The transmit/receive component 1314 and determining component 1316 may be coupled to the processor 1304 via bus 1306. In certain aspects, the transmit/receive component 1314 and determining component 1316 may be implemented as hardware circuits. In certain aspects, the transmit/receive component 1314 and determining component 1316 may be software components that are executed and run on processor 1304.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a relay node, comprising:
   receiving downlink control signaling indicating a time domain resource allocation for a wireless resource to communicate with a donor base station;
   determining a scheduling offset, relative to a reference point, to use for the wireless resource within a set of available time domain resources not designated for communicating with one or more child nodes and not designated to a communication of one or more other nodes based on the indicated time domain resource allocation, wherein the reference point includes a time domain resource corresponding to when the downlink control signaling or a physical downlink shared channel (PDSCH) is received, wherein the scheduling offset is spaced from the reference point within the available time domain resources by the indicated time domain resource allocation or located at a first available time domain resource within the set of available time domain resources after or including the indicated time domain resource allocation from the reference point; and
   communicating with the donor base station using the wireless resource at the determined scheduling offset.

2. The method of claim 1, wherein the scheduling offset indicates one or more slots, one or more mini-slots, or one or more symbols.

3. The method of claim 1, wherein the wireless resource comprises at least one of a PDSCH resource, a physical uplink control channel (PUCCH) resource, or a physical uplink shared channel (PUSCH) resource.

4. The method of claim 1, wherein the indicated time domain resource allocation is designated for backhaul communications with the donor base station.

5. The method of claim 1, wherein the indicated time domain resource allocation is an index corresponding to a list of time-domain resource configurations having a maximum number of resource allocations, wherein the maximum number of resource allocations is greater than a maximum number of resource allocations for a type of user equipment.

6. The method of claim 1, wherein the indicated time domain resource allocation corresponds to a resource designated for at least one of backhaul communications with the donor base station or other scheduled communications.

7. The method of claim 1, wherein the indicated time domain resource allocation comprises an aggregation factor indicating consecutive resources that are allocated for backhaul communications with the donor base station.

8. The method of claim 7, wherein determining the scheduling offset comprises identifying consecutive available resources within the set of available time domain resources based on the aggregation factor.

9. A method of wireless communication by a donor base station, comprising:
    determining a time domain resource allocation for a wireless resource to communicate with a relay node within a set of available time domain resources not designated for the relay node to communicate with one or more child nodes and not designated to a communication of one or more other nodes;
    transmitting downlink control signaling indicating the time domain resource allocation for a scheduling offset, relative to a reference point, to use for the wireless resource, wherein the reference point includes a time domain resource corresponding to when the downlink control signaling or a physical downlink shared channel (PDSCH) is received at the relay node, wherein the scheduling offset is spaced from the reference point within the available time domain resources by the time domain resource allocation or located at a first available time domain resource within the set of available time domain resources after or including the time domain resource allocation from the reference point; and
    communicating with the relay node using the wireless resource at the scheduling offset.

10. The method of claim 9, wherein the scheduling offset indicates one or more slots, one or more mini-slots, or one or more symbols relative.

11. The method of claim 9, wherein the wireless resource comprises at least one of a PDSCH resource, a physical uplink control channel (PUCCH) resource, or a physical uplink shared channel (PUSCH) resource.

12. The method of claim 9, wherein the indicated time domain resource allocation is designated for backhaul communications with the relay node.

13. The method of claim 9, wherein the indicated time domain resource allocation is an index corresponding to a list of time-domain resource configurations having a maximum number of resource allocations, wherein the maximum number of resource allocations is greater than a maximum number of resource allocated for a type of user equipment.

14. The method of claim 9, wherein the indicated time domain resource allocation corresponds to a resource designated for at least one of backhaul communications with the relay node or other scheduled communications.

15. The method of claim 9, wherein the indicated time domain resource allocation comprises an aggregation factor indicating consecutive resources that are allocated for backhaul communications with the relay node.

16. The method of claim 15, wherein determining the time domain resource allocation comprises identifying consecutive available resources within the set of available time domain resources based on the aggregation factor.

17. An apparatus for wireless communication, comprising:
    a receiver configured to receive downlink control signaling indicating a time domain resource allocation for a wireless resource to communicate with a donor base station; and
    a processing system configured to determine a scheduling offset, relative to a reference point, to use for the wireless resource within a set of available time domain resources not designated for communicating with one or more child nodes and not designated to a communication of one or more other nodes based on the indicated time domain resource allocation, wherein the reference point includes a time domain resource corresponding to when the downlink control signaling or a physical downlink shared channel (PDSCH) is received, wherein the scheduling offset is spaced from the reference point within the available time domain resources by the indicated time domain resource allocation or located at a first available time domain resource within the set of available time domain resources after or including the indicated time domain resource allocation from the reference point; and
    an interface configured to communicate with the donor base station using the wireless resource at the determined scheduling offset.

18. An apparatus for wireless communication, comprising:
    a processing system configured determine a time domain resource allocation for a wireless resource to communicate with a relay node within a set of available time domain resources not designated for the relay node to communicate with one or more child nodes and not designated to a communication of one or more other nodes;
    a transmitter configured to transmit downlink control signaling indicating the time domain resource allocation for a scheduling offset, relative to a reference point, to use for the wireless resource, wherein the reference point includes a time domain resource corresponding to when the downlink control signaling or a physical downlink shared channel (PDSCH) is received at the relay node, wherein the scheduling offset is spaced from the reference point within the available time domain resources by the time domain resource allocation or located at a first available time domain resource within the set of available time domain resources after or including the time domain resource allocation from the reference point; and
    an interface configured to communicate with the relay node using the wireless resource at the scheduling offset.

* * * * *